(12) United States Patent
Szczerba et al.

(10) Patent No.: US 7,302,322 B1
(45) Date of Patent: Nov. 27, 2007

(54) VEHICULAR INTERFACE INCLUDING ARMREST CONTROL ASSEMBLY

(75) Inventors: Joseph F. Szczerba, Grand Blanc, MI (US); John K. Lenneman, Okemos, MI (US); Scott P. Geisler, Clarkston, MI (US); Branden G. Neish, Shelby Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/426,983

(22) Filed: Jun. 28, 2006

(51) Int. Cl.
*G01M 17/00* (2006.01)
*G06F 7/00* (2006.01)
*G06F 19/00* (2006.01)

(52) U.S. Cl. .............................. 701/29; 701/36; 701/49
(58) Field of Classification Search ................... 701/29, 701/49, 36; 307/10.1
See application file for complete search history.

(56) References Cited

U.S. PATENT DOCUMENTS

| | | | | |
|---|---|---|---|---|
| 3,703,931 A | * | 11/1972 | Page et al. ................... 172/4.5 |
| 4,200,837 A | * | 4/1980 | Larsen et al. .................. 455/92 |
| 4,381,548 A | * | 4/1983 | Grossman et al. ............ 701/29 |
| 4,517,424 A | * | 5/1985 | Kroczynski ............... 200/52 R |
| 4,717,098 A | * | 1/1988 | Walker et al. ............... 244/223 |
| 4,849,732 A | * | 7/1989 | Dolenc ......................... 341/20 |
| 4,913,573 A | * | 4/1990 | Retter ......................... 400/489 |
| 4,971,465 A | * | 11/1990 | Hashimoto .................. 400/485 |
| 5,178,477 A | * | 1/1993 | Gambaro ..................... 400/489 |
| 5,481,263 A | * | 1/1996 | Choi ............................ 341/20 |
| 5,735,693 A | * | 4/1998 | Groiss ......................... 434/157 |
| 5,743,666 A | * | 4/1998 | VanZeeland et al. ........ 400/485 |
| 5,764,164 A | * | 6/1998 | Cartabiano et al. ........... 341/22 |
| 5,945,646 A | * | 8/1999 | Miller et al. ................. 200/5 R |
| 6,559,773 B1 | * | 5/2003 | Berry ....................... 340/815.4 |
| 2002/0125988 A1 | * | 9/2002 | Nagasaka .................... 340/3.7 |
| 2003/0105568 A1 | * | 6/2003 | Melnyk et al. ............... 701/36 |
| 2003/0154008 A1 | * | 8/2003 | Nakamura .................... 701/29 |
| 2003/0234170 A1 | * | 12/2003 | Wecke et al. ............... 200/538 |
| 2004/0031667 A1 | * | 2/2004 | Dinkel et al. ............... 200/5 A |
| 2004/0117084 A1 | * | 6/2004 | Mercier et al. ............... 701/36 |
| 2004/0249527 A1 | * | 12/2004 | Tomita et al. ................. 701/29 |
| 2005/0029871 A1 | * | 2/2005 | Mori et al. ................. 307/10.3 |
| 2006/0214451 A1 | * | 9/2006 | Haba et al. ............... 296/37.12 |

* cited by examiner

*Primary Examiner*—Thomas Black
*Assistant Examiner*—Jorge O Peche

(57) ABSTRACT

A user control assembly is provided for use on a vehicle equipped with a processor, an armrest, and a plurality of vehicular systems each having at least one adjustable feature associated therewith that may be controlled by the processor. The user control assembly comprises a first button deployed in the armrest and coupled to the processor for selecting a vehicular system from the plurality of vehicular systems, and a first rotary dial deployed in the armrest and coupled to the processor for adjusting a first feature associated with a selected vehicular system.

13 Claims, 5 Drawing Sheets

VEHICULAR INTERFACE INCLUDING ARMREST CONTROL ASSEMBLY

TECHNICAL FIELD

The present invention generally relates to a vehicular interface and, more particularly, to a control assembly deployed in the armrest of a vehicle for use in conjunction with an improved vehicular interface.

BACKGROUND OF THE INVENTION

Nearly every vehicle produced today is equipped with a host of vehicular systems each having a variety features that may be adjusted by the vehicle's driver or passenger between various settings. A modern vehicular audio system, for example, may require a user to choose from multiple audio sources (e.g., CD, XM radio, FM radio, AM radio, onboard hard drive, an auxiliary source, etc.), and then from a plurality of features associated with the selected audio source (e.g., tracks for a particular CD, stations for FM radio, audio files for the onboard hard drive, etc.). Additionally, the user may be permitted to fine tune the audio system's tone balance (e.g., adjust the relative levels of bass, treble, mid-range tones, etc.), adjust the system's volume, and/or manipulate the appearance of a display (e.g., time display for CD tracks, broadcast text display for radio, graphic equalizer display, backlight color, etc.).

User interfaces have been developed that allow users to control multiple vehicular systems to help manage the ever-growing number of vehicular systems and system features. One known user interface, referred to as a Driver Information Center (DIC), includes a plurality of user inputs (e.g., buttons) and a display (e.g., a liquid crystal display) capable of displaying several lines of characters. The DIC is typically disposed on the vehicle's center stack located between the driver seat and the front passenger seat so that the controls may be accessed by either the driver or a front passenger of the vehicle. To utilize the DIC interface, a user navigates through a tiered hierarchy of menus to view and select amongst various vehicular systems and the adjustable features associated therewith. Tiered menu structures of this type often require that a user advance through several different levels of menus to locate a desired feature and thus may become relatively complex. Additionally, such menu structures may not permit the simultaneous display of multiple groups of system features. The conventional control assemblies utilized to interact with user interfaces may also be disadvantageous in certain respects. If the control assembly is mounted on the vehicle's center stack, for example, it may be somewhat inconvenient to a driver. If instead mounted on a vehicle's steering wheel, the controls assembly is not accessible to front-seat passengers of the vehicle.

It should thus be appreciated that it would be desirable to provide a user interface employing relatively intuitive and shallow menu structure (i.e., comprising no or few tiers). It should also be appreciated that is would be desirable to provide a means for utilizing such a user interface, such as a user control assembly that is convenient to a driver and easily accessible to front-seat passengers of a vehicle. Furthermore, other desirable features and characteristics of the present invention will become apparent from the subsequent detailed description and the appended claims, taken in conjunction with the accompanying drawings and the foregoing technical field and background.

SUMMARY OF THE INVENTION

A user control assembly is provided for use on a vehicle equipped with a processor, an armrest, and a plurality of vehicular systems each having at least one adjustable feature associated therewith that may be controlled by the processor. The user control assembly comprises a first button deployed in the armrest and coupled to the processor for selecting a vehicular system from the plurality of vehicular systems, and a first rotary dial deployed in the armrest and coupled to the processor for adjusting a first feature associated with a selected vehicular system.

DESCRIPTION OF THE DRAWINGS

The present invention will hereinafter be described in conjunction with the following drawing figures, wherein like numerals denote like elements, and.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
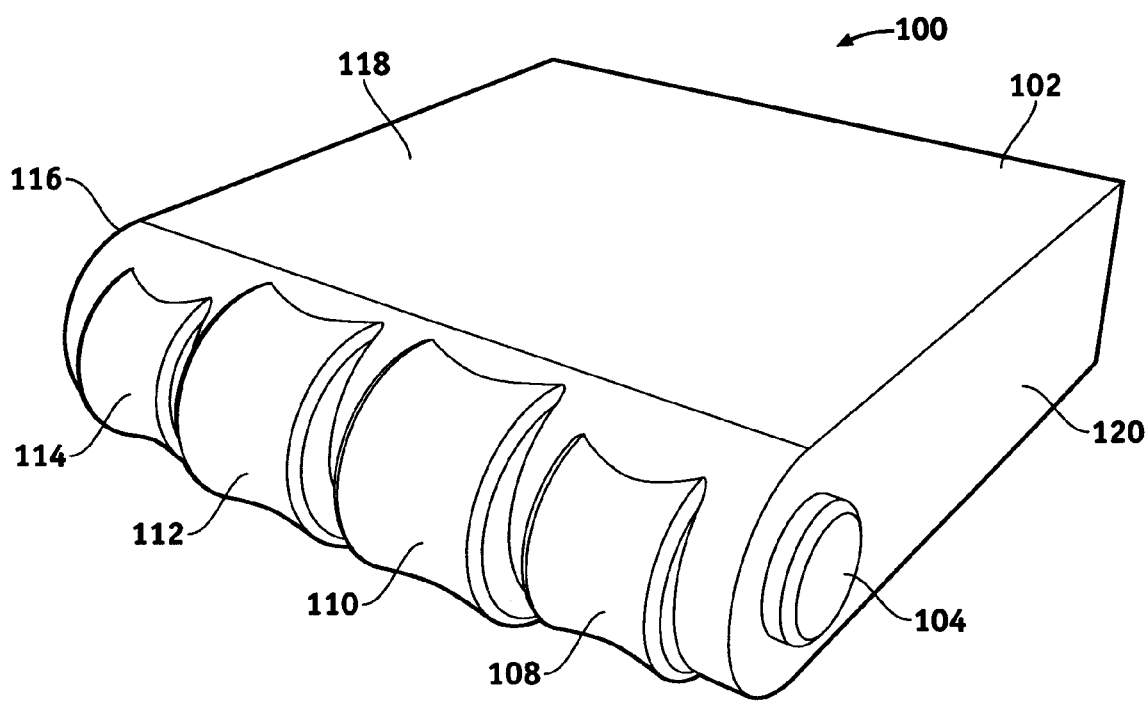
FIGS. 1 and 2 are isometric and top views of a user control deployed on an armrest of a vehicle in accordance with a first embodiment of the present invention.
Figure 2:
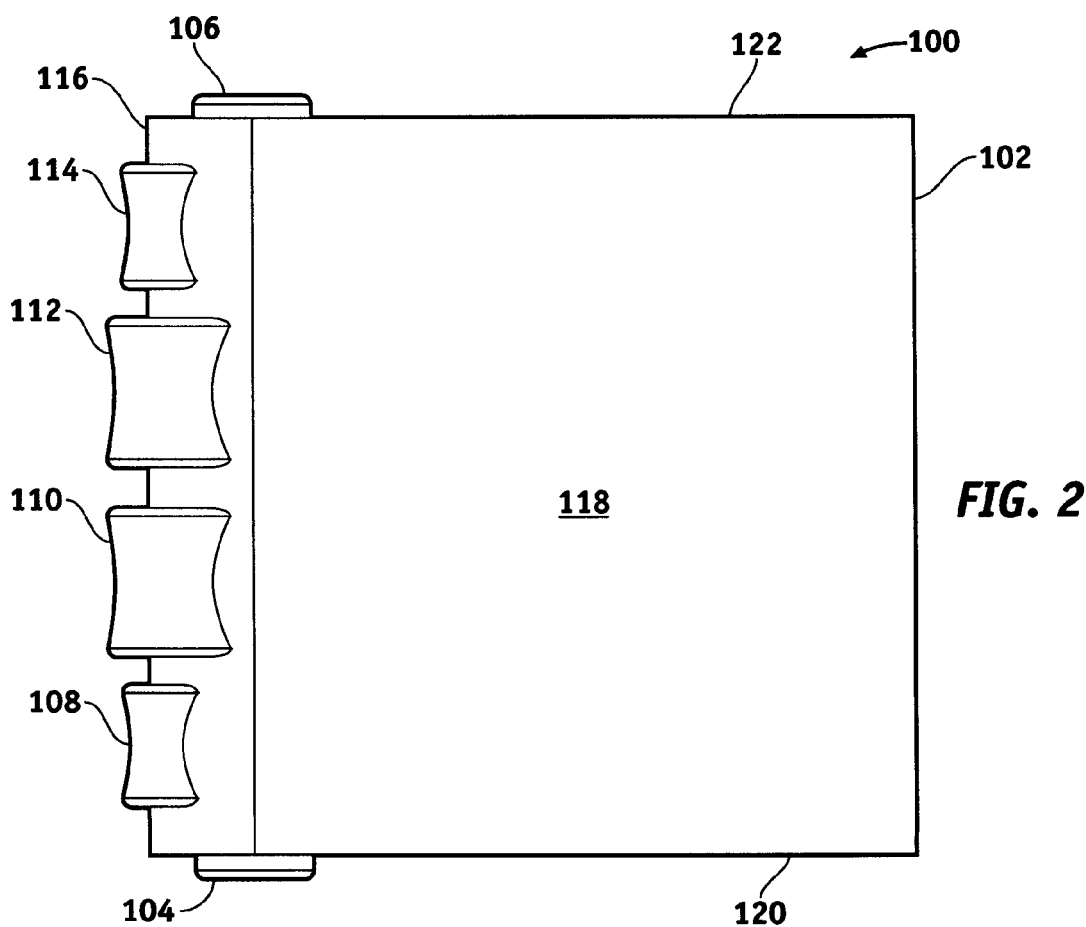

FIGS. 1 and 2 are isometric and top views of a user control assembly 100 deployed on an armrest 102 of a vehicle (not shown). To provide access to both the driver and a front passenger of the vehicle, armrest 102 is preferably deployed between the driver seat and the front passenger seat of the vehicle. For this reason, armrest 102 will be discussed hereafter as being deployed in this manner; however, it should be understood that armrest 102 may also be deployed in other suitable locations within the vehicle's passenger compartment (e.g., on the driver side door). User control assembly 100 comprises at least one rotary dial and at least one button. In the exemplary embodiment illustrated in FIGS. 1 and 2, user control assembly 100 comprises four rotary dials 108, 110, 112, and 114 and two buttons 104 and 106. Rotary dials 108, 110, 112, and 114 may be disposed proximate a frontal portion 116 of armrest 102 so as to be readily accessible to a user (i.e., a driver or front-seat passenger of the vehicle in which armrest 102 is deployed). In particular, a user may rest their arm on an upper surface 118 of armrest 102 and manipulate the rotary dials with their fingers. Buttons 104 and 106 are disposed proximate side portions 120 and 118 of armrest 102, respectively. If the vehicle is a left hand drive (LHD) vehicle (i.e., a vehicle wherein the steering wheel is located on the driver's left hand side) side portions 120 and 118 may be referred disposed adjacent the driver side and passenger side seats, respectively. Thus, if user control assembly 100 is employed in a LHD vehicle, side portion 120 may be referred to as the driver side portion and side portion 118 may be referred to as a passenger side portion. A driver may selectively depress button 104 with the thumb on their right hand. Alternatively, a passenger may selectively depress button 106 with the thumb on their left hand. In either case, the user may actuate either button 104 or button 106 with their thumb, while simultaneously manipulating rotary dials 108, 110, 112, and 114 with their other fingers.

If desired, rotary dials 108, 110, 112, and 114 may be provided with an ergonomic shape (e.g., a radial depression). To increase the ease with which a driver may locate a desired dial, the rotary dials may also be made tactilely distinguishable from one another. For example, the outer surfaces of rotary dials 108, 110, 112, and 114 may be provided with varying tactile patterns (e.g., various combinations of ridges, bumps, concavities, etc.). Additionally, the rotary dials may be chosen to be different sizes. As shown in FIGS. 1 and 2, for example, each of the two inner rotary dials (i.e., dials 110 and 112) may be chosen to be wider and have a larger diameter than the two outer rotary dials (i.e., dials 108 and 114).

Figure 3:
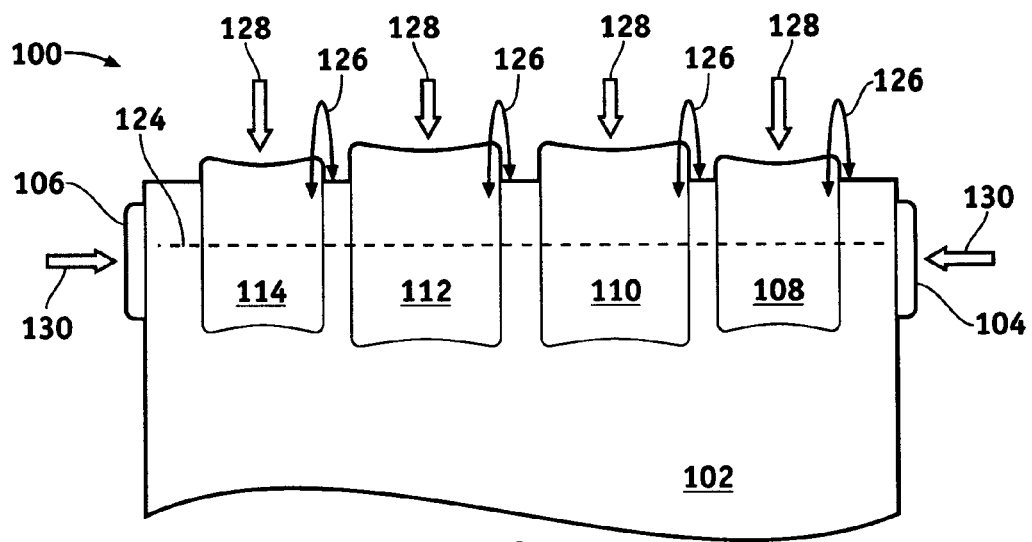
FIG. 3 is a functional top view of the user control shown in FIGS. 1 and 2 illustrating the ways in which the buttons and rotary dials of the user control may be actuated.

FIG. 3 is a functional top view, partially in cross-section, of user control assembly 100 illustrating the various ways in which buttons 104 and 106 and rotary dials 108, 110, 112, and 114 may be actuated by a user. Buttons 104 and 106 are configured to be depressable (indicated by arrows 130), and rotary dials 108, 110, 112, and 114 are configured to be rotatable (indicated by arrows 136. In addition, some or all of the rotary dials of armrest control assembly 100 assembly may also be configured to be depressible (indicated in FIG. 3 by arrows 128). Rotary dials 108, 110, 112, and 114 may be configured to rotate about a common rotational axis 124, which may be substantially parallel to the activation axis of buttons 104 and 106. By disposing the rotary dials and buttons 104 and 106 in this manner, control assembly 100 may be tailored to suit the body mechanics of a driver's or passenger's hand. As will be seen, control assembly 100 may be utilized to interact with a user interface deployed on a vehicle and adjust the features of vehicular systems to preference. In particular, buttons 104 and 106 may be utilized to select a particular vehicular application under the control of the user interface, and rotary dials 108, 110, 112, and 114 may be utilized to adjust one or more features associated with a selected vehicular application.

Figure 4:
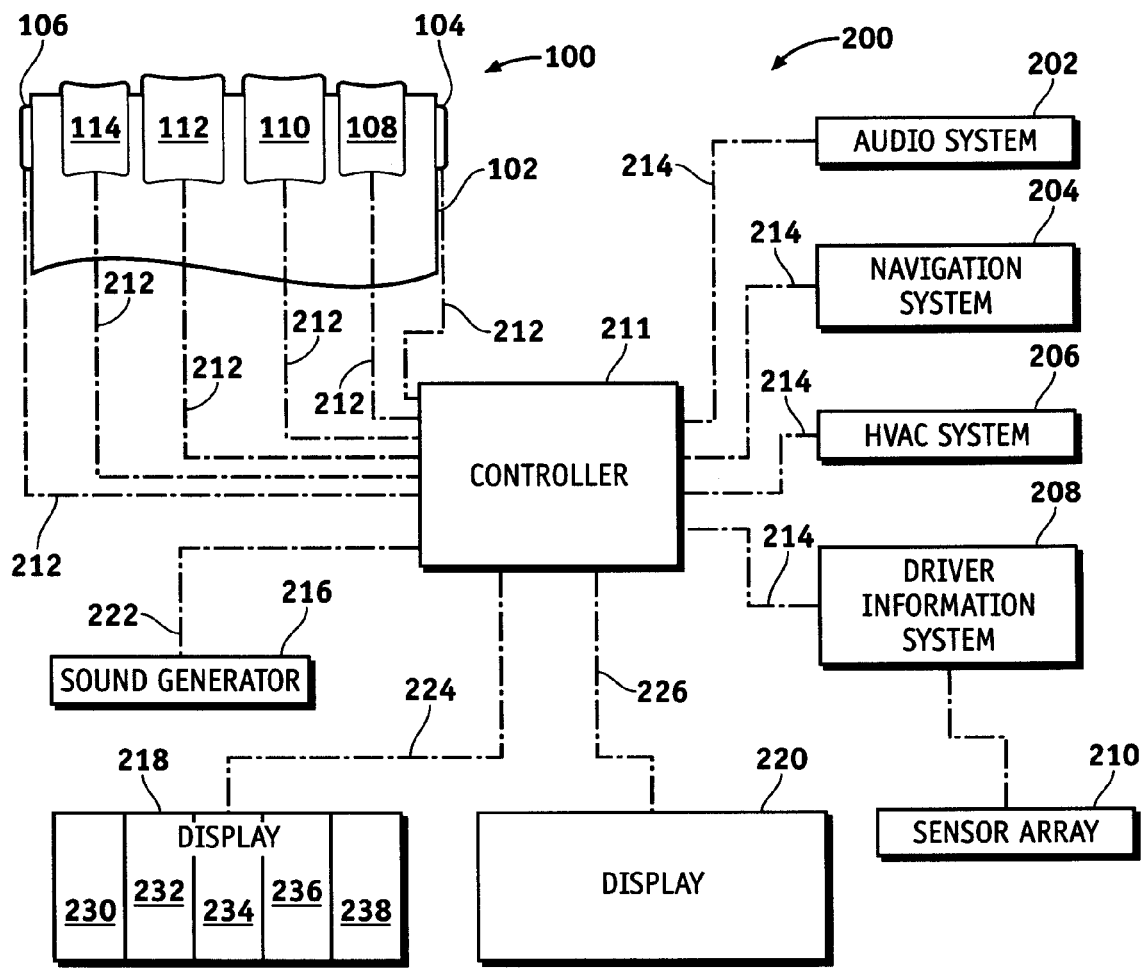
FIG. 4 is a block diagram of a user interface including the user control shown in FIGS. 1-3, a first display, a second display, a sound generator, and a plurality of vehicular systems.

FIG. 4 is a schematic of a user interface 200 including user control assembly 100 (FIGS. 1-3). User interface 200 allows a user to select options and adjust features associated with various vehicular systems. In addition, user interface 200 may permit a user to access vehicle status data (e.g., oil life, gas mileage, etc.) and customize certain vehicular characteristics (e.g., seat positioning, automatic door lock timing, etc.). In the illustrated embodiment, user interface 200 is capable of controlling four vehicular systems; i.e., an audio system 202; a navigational system 204; a heating, ventilation, and air conditioning (HVAC) system 206; and a driver information system 208, which is coupled to a sensor array 210 comprising a plurality of sensors each monitoring a different vehicular operating condition (e.g., tire pressure, engine temperature, etc.).

User interface 200 comprises a controller 211 that is coupled to user control assembly 100 and to each of the vehicular systems controllable by interface 200 via data lines 212 and 214, respectively. Additionally, controller 211 is coupled to a first display 218 via data line 224. Display 218 may comprise a head-up display mounted proximate the vehicle's steering wheel (e.g., within the instrument control panel or within the vehicle's windshield). If desired, user interface 200 may also include a second display 220 and/or a sound generator 216, which may be coupled to controller 211 via respective data lines 222 and 226. A second display 220 may be mounted at a location (e.g., proximate the vehicle's center stack) readily viewable by a passenger of the vehicle so that a user may refer to display 220 when utilizing user interface 200. Display 220 is preferably configured to provide to a passenger with substantially the same information as display 218 provides to a driver. It should be understood, however, that display 220 is not essential to interface 200 and, consequently, only display 218 will be described in detail below.

Display 218 is configured to identify the vehicular systems controllable by interface 200 and the adjustable features associated with each. Preferably, display 218 is visually organized into a plurality of display columns. As illustrated in FIG. 4, for example, display 218 may be divided into five display columns 230, 232, 234, 236, and 238. One column (e.g., column 230) may be configured to display the selected vehicular system. At the same time, the remaining columns (e.g., columns 232, 234, 236, and 238) may each display a different adjustable feature associated with the selected system (i.e., an adjustable aspect of the system, such as temperature for HVAC system 206) or options associated with particular system features as described below.

Figure 5:
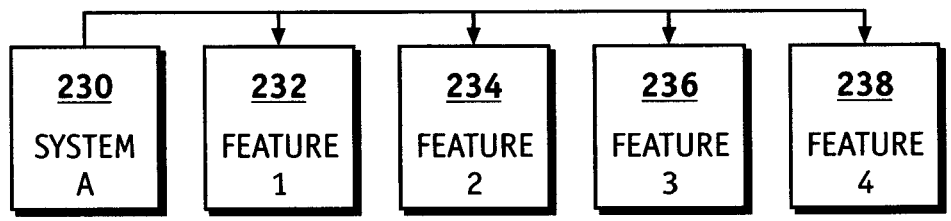
FIGS. 5 and 6 are block diagrams illustrating the relationship between first and second vehicular systems, respectively, and the features associated therewith as displayed by the user interface shown in FIG. 4.

FIG. 5 is block diagram illustrating the relationship between a selected vehicular system (SYSTEM A) and four adjustable features associated therewith as displayed on display 218 of user interface 200 (FIG. 4). As shown in FIG. 5, display column 230 indicates that SYSTEM A has been selected, and display columns 232, 234, 236, and 238 each display a different feature associated with SYSTEM A (i.e., system features 1, 2, 3, and 4, respectively). For example, if SYSTEM A were HVAC system 206 (FIG. 4), column 232 might display a heating/ventilation/cooling feature, column 234 might display a driver temperature feature, column 236 might display a passenger temperature feature, and column 238 might display a vent selection feature.

Figure 6:
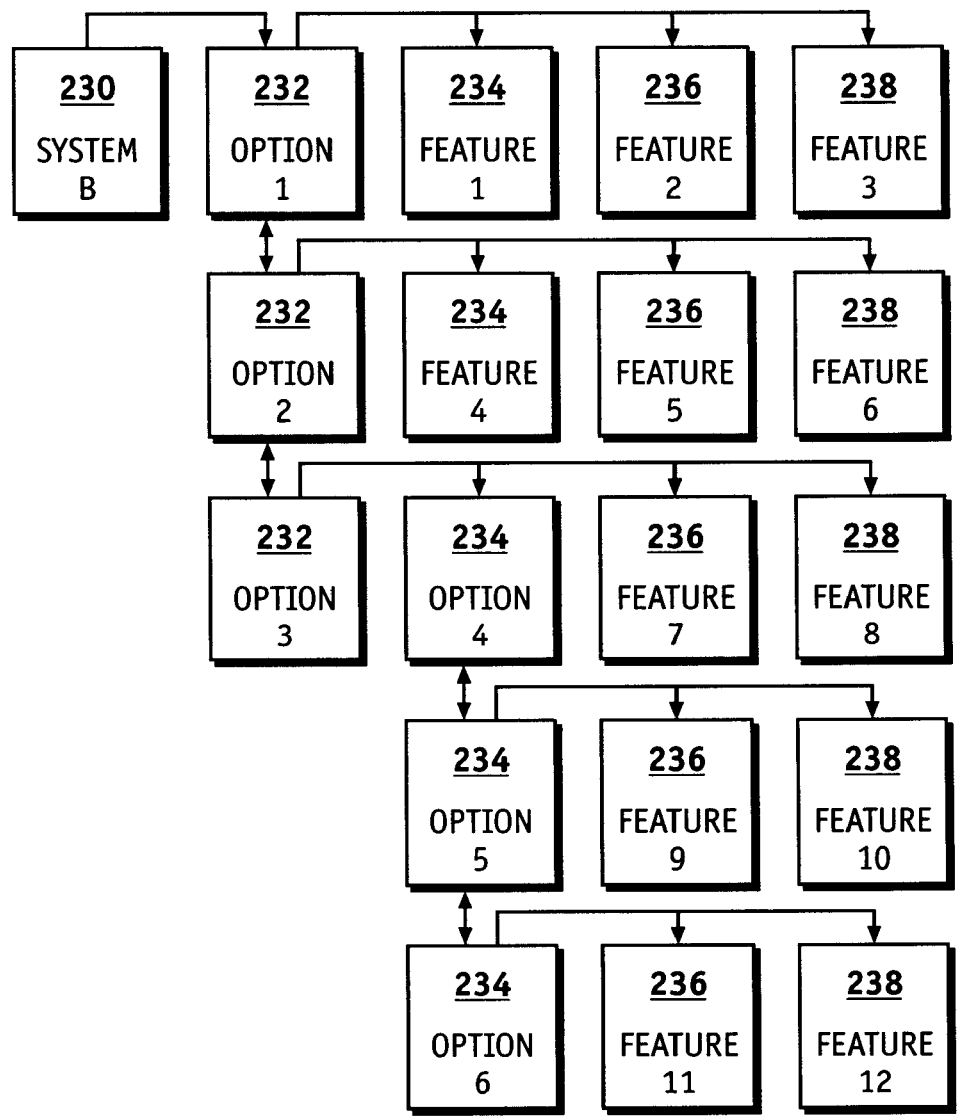

FIG. 6 is block diagram illustrating the relationship between a selected vehicular system (SYSTEM B) having multiple adjustable features associated with multiple options as expressed by display 218 of user interface 200 (FIG. 4). As was the case previously, display column 236 indicates the selected system (SYSTEM B). Display column 232 provides a user with a visual representation (e.g., a textual list, a group icons, etc.) of three options (OPTIONS 1-3) associated with SYSTEM B that he or she may select amongst in the manner described below. If a user selects OPTION 1 or OPTION 2, display columns 234, 236, and 238 will each display a different feature associated with the selected option (i.e., FEATURES 1-3 or FEATURES 4-6, respectively). In contrast, if a user selects OPTION 3, display column 234 provides the user with three more options (OPTIONS 4-6) from which the user may select amongst. Again, the features displayed in columns 236 and 238 change in relation to the option the user selects from column 234. Thus, if OPTION 4 is selected, display columns 236 and 238 will display and the user will be permitted to choose amongst adjustable FEATURES 7 and 8, respectively; if OPTION 5 is selected, display columns 236 and 238 will display and the user will be permitted to choose amongst adjustable FEATURES 9 and 10, respectively; and if OPTION 6 is selected, display columns 236 and 238 will display and the user will be permitted to choose amongst adjustable FEATURES 11 and 12, respectively. As will be further illustrated below, multi-dependent arrangements of this type are useful to organize vehicular systems having a large number of adjustable system features (e.g., audio systems, navigational system, etc.).

Figure 7:
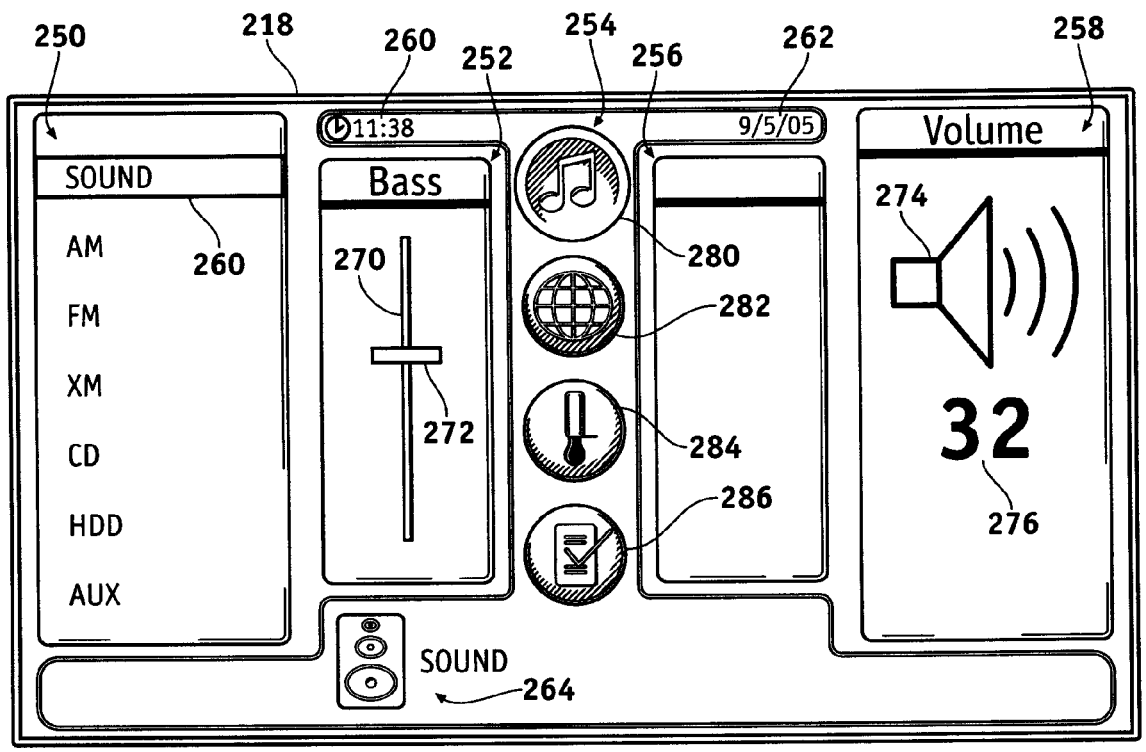
FIGS. 7-10 illustrate one way in which the first display of the user interface shown in FIG. 4 may be configured to appear as a user adjusts features associated with a vehicle's audio system.

FIGS. 7-10 illustrate one way in which display 218 of the user interface 200 may be configured to appear as a user adjusts features associated with audio system 202 (FIG. 4). As can be seen, display 218 includes three general display elements (i.e., a time indicator 260, a date indicator 262, and a status indicator 264) and five discrete display columns (i.e., an outer left column 250, an inner left column 252, a central column 254, an inner right column 256, and an outer right column 258). Central display column 254 indicates the vehicular systems that may be adjusted via user interface 200 and the vehicular system that is currently selected. Column 254 may do this by displaying a vertical row of icons each representing a different vehicular system. As shown in FIG. 7, a first icon 280 (a musical note) represents audio system 202, a second icon 282 (a stylized globe) represents navigation system 204, a third icon 284 (a thermometer) represents HVAC system 206, and a fourth icon 286 (a checked box) represents driver information system 208. Icons 280, 282, 284, and 286 may be configured to appear depressed (convex) when selected and raised (convex) when not selected. Icon 280 appears depressed in FIG. 7 thus indicating that audio system 202 is currently selected. This may also be indicated by status indicator 264, which may display descriptive text (i.e., "SOUND") and a suggestive graphic (i.e., a speaker).

Button 104 or button 106 (FIGS. 2-4) may be utilized to select amongst audio system 202, navigation system 204, HVAC system 206, and driver information system 208. That is, a user of interface 200 may select a desired vehicular system by repeatedly pressing button 104 or button 106 until display column 254 indicates that the desired system is selected. A user desiring to alter the temperature in the passenger compartment of the vehicle, for example, would press button 104 or button 106 twice to move the selection from audio system 202 to HVAC system 206. When HVAC system 206 is selected, icon 284 will appear depressed and status indicator 264 will display a new textual message (e.g., "CLIMATE CONTROL") and graphic (e.g., an ice crystal) indicative of the newly selected system. Sound generator 216 (FIG. 4) may also provide some form of audible feedback (e.g., a chime or message such as "climate control selected") to further indicate the newly selected system.

Figure 9:
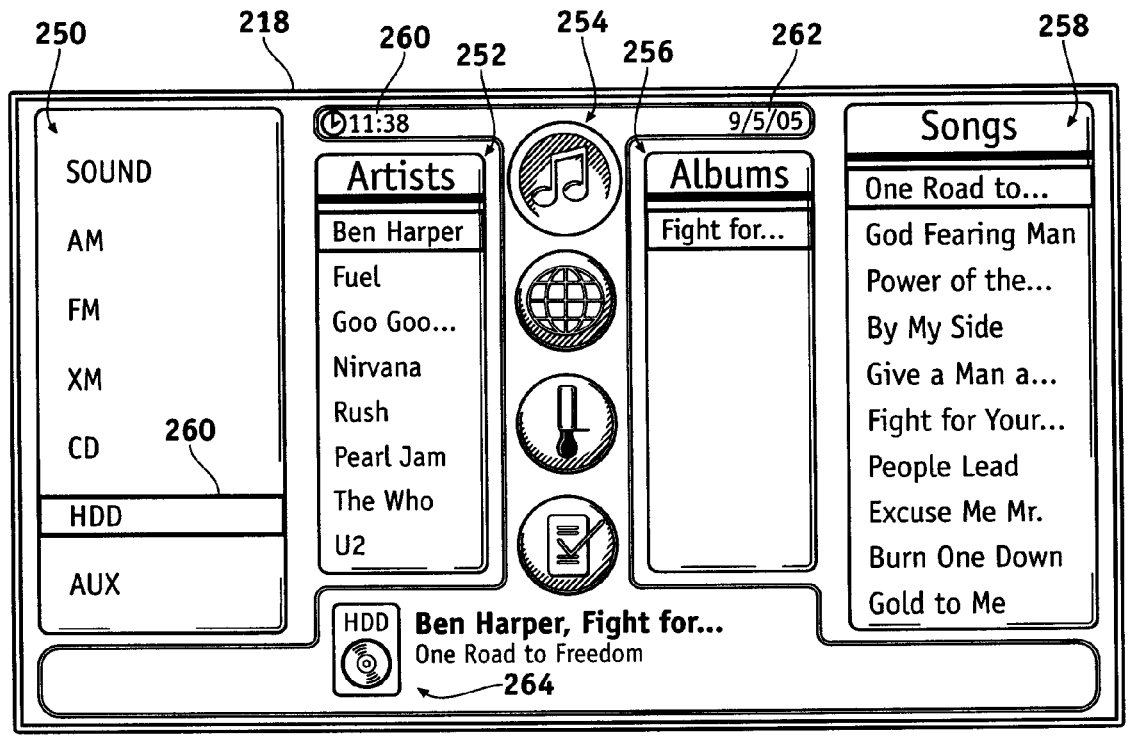

After a vehicular system is selected in the manner described above, columns 250, 252, 256, and 258 may each display an option or a feature associated with the selected system. As shown in FIG. 5, for example, when audio system 202 is selected, column 250 may display audio source options (e.g., AM, FM, XM, CD, hard-disc drive, and auxiliary) and a SOUND option. When the SOUND option is selected (as indicated in FIG. 7 by highlight bar 260), column 252 may display tone balance features (e.g., the base or treble level), and column 258 may display a volume feature. The features displayed in columns 252 and 258 are dependent upon the selected SOUND option indicated in column 250. Thus, if a user were to change the selected SOUND option by rotating dial 108 (FIGS. 1-4), the features shown in columns 252 and 258 will change correspondingly. When the HDD option is selected as shown in FIG. 9, for example, columns 252 and 258 will each display a new feature associated with the HDD option. This notwithstanding, it should also be remembered that certain features may be dependent only upon the selected system. For example, referring again to FIG. 7, the selection of a particular bass level from column 252 will have no bearing on the audio source feature shown in column 250 or the volume level feature shown in column 258.

Figure 8:
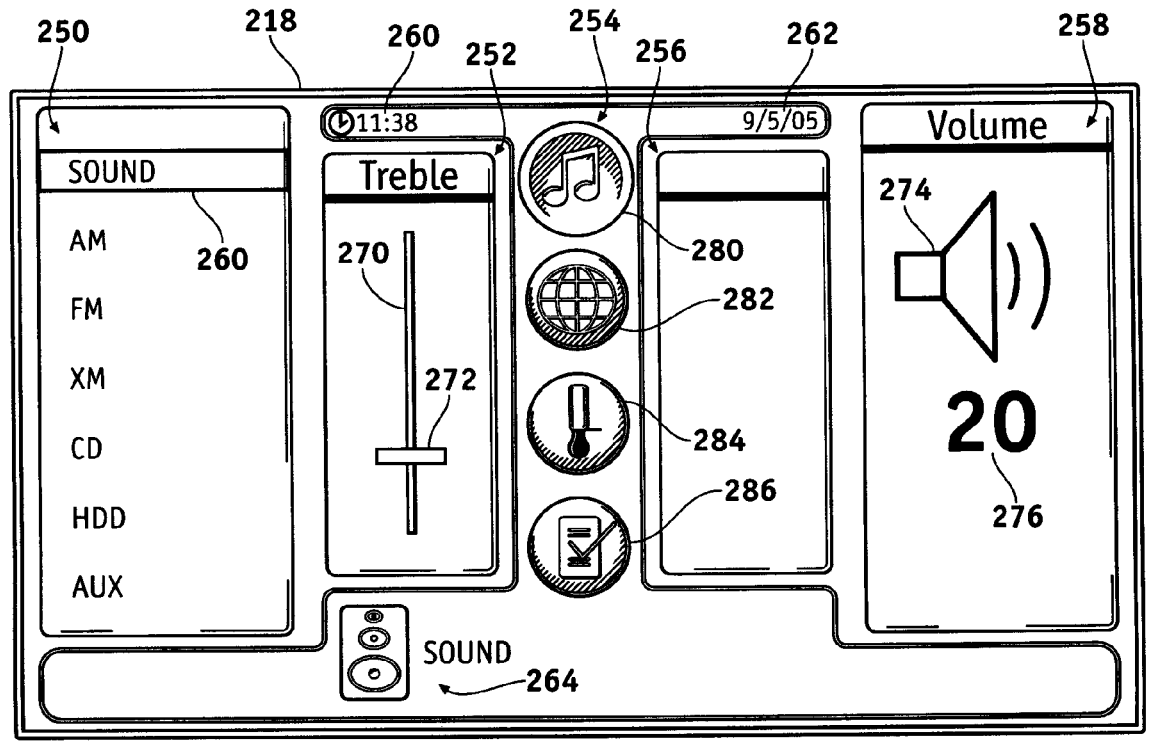

In accordance with an exemplary embodiment of the present invention, a user may select amongst the options and features shown in display columns 250, 252, 254, and 256 via rotary dials 108, 110, 112, and 114, respectively. In certain instances, the selection process may simply involve rotating the dial associated with a particular feature (or option) until the associated display column indicates that the feature (or option) has been selected. A user wishing to adjust the volume feature of audio system 202, for example, may do so by rotating dial 114 until the desired volume setting is achieved. To decrease the volume level of audio system 202 (as shown in FIG. 7), a user may rotate dial 114 in a first direction until the volume reaches the desired level (as shown in FIG. 8), which may be indicated by graphic 274 and decibel display element 276. To increase the volume level, a user may simply rotate dial 114 in a second direction (opposite the first direction) until the desired increase in volume is achieved.

Certain features may comprise multiple feature aspects, only one of which may be displayed in a particular column at a particular time. Referring to FIGS. 7 and 8, it may be seen that the tone balance option displayed in column 252 comprises at least two adjustable feature aspects: a first feature aspect shown in FIG. 7 (i.e., the bass level) and a second feature aspect shown in FIG. 8 (i.e., the treble level). A user may select amongst these adjustable aspects by depressing the dial associated with the adjustable feature. For example, user may press rotary dial 110 to move from the bass level aspect (FIG. 7) to the treble level aspect (FIG. 8). A user may then return to the bass level aspect (FIG. 7) by again pressing rotary dial 110, or instead adjust the treble level by rotating dial 110 to graphically move slide 272 upward or downward on slide control 270.

Certain selection processes may require a user perform two steps to complete selection. First, the user may be required to specify a feature or option by rotating a rotary dial as described above. Secondly, the user may be required to select or activate that option or feature by depressing the rotary dial. A may choose the HDD option from the group displayed in display column 250, for example, by first rotating dial 108 until the HDD option is highlighted by highlight bar 260 (shown in FIG. 7) and by subsequently depressing dial 108 to select the HDD option. This type of multi-step selection process may be preferable when it is not desirable to activate multiple options or features when navigating to a desired feature.

Figure 10:
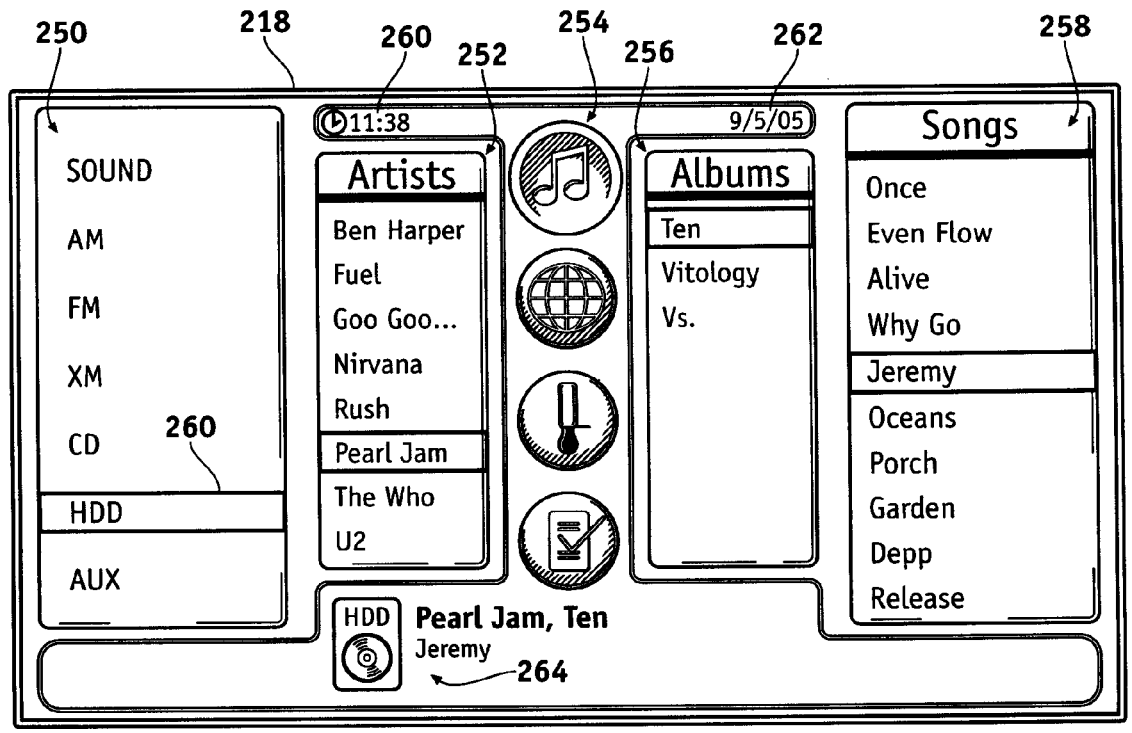

Display columns 252, 256, and 258 will each display a different feature or option associated with a selected HDD option. For example, columns 252, 256, and 258 may display textual lists of artists, albums, and songs, respectively, as shown in FIG. 9. Status indicator 264 may also change reflect the newly selected audio system option (i.e., the speaker graphic may change to a disc graphic and the text may change to describe the current artist, album, and song). It should thus appreciated that the feature displayed in column 258 is dependent on the selected option from column 256, which is, in turn, dependent on the selected option from column 252. That is, the song feature (column 258) is dependent upon the album selected from the album option (column 256), which is dependent upon the artist selected from the artist option (column 252). If a user were to rotate dial 110 to select "Pearl Jam" from the artists option (column 252) as shown in FIG. 10, the album option (column 256) would change to a group containing Pearl Jam albums stored on the hard-disc drive of audio system 202. If, after selecting Pearl Jam from the artists option (column 252), a user were to rotate dial 112 to select a different album from the Pearl Jam album option (column 256), the song feature (column 258) would change to indicate the songs from the newly selected album that are stored on the hard-disc drive of audio system 202.

It should thus be appreciated from the above that a user interface particularly employing a relatively intuitive and shallow menu structure (i.e., comprising no or few tiers) has been provided. It should also be appreciated that a user control for utilizing such a user interface has also been provided, which is easily accessible to both a driver and a front-seat passenger of a vehicle. Though described above as employing multiple rotary dials and buttons, it should be appreciated that the inventive user control may include only one rotary and one button. Additionally, it should be understood that the user interface may also be used to access and view vehicle status data (e.g., gas mileage, tire pressure, oil life, etc.). While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A user control assembly for use on a vehicle equipped with a processor and an armrest, the processor for controlling a plurality of vehicular systems each having a plurality of adjustable features associated therewith, the user control assembly comprising:
   a first button deployed in the armrest and coupled to the processor for selecting a vehicular system from the plurality of vehicular systems, said first button configured to be depressed along an activation axis;
   a first rotary dial deployed in the armrest and coupled to the processor for adjusting a first feature associated with a selected vehicular system; and
   a second rotary dial deployed in the armrest and coupled to the processor for adjusting a second adjustable feature associated with the selected system, said first rotary dial and said second rotary dial having a substantially common linear rotational axis that is substantially co-linear with said activation axis.

2. A user control assembly according to claim 1 wherein the vehicle includes a driver seat and a front passenger seat, and wherein the armrest is disposed between the driver seat and front passenger seat.

3. A user control assembly according to claim 2 further comprising a second button deployed in the armrest and coupled to the processor for selecting a vehicular system from the plurality of vehicular systems.

4. A user control assembly according to claim 3 wherein said first button is situated proximate the driver seat and wherein said second button is situated proximate the front passenger seat.

5. A user control assembly according to claim 1 wherein said first rotary dial is configured to be depressed to activate an adjustable feature for at least one of the plurality of adjustable vehicular systems.

6. A user control assembly according to claim 1 wherein at least one of the features comprises multiple adjustable aspects, and wherein said first rotary dial is configured to be depressed to select amongst the multiple adjustable aspects.

7. A user interface for use on a vehicle having an armrest and a plurality of vehicular systems each having a plurality of adjustable features associated therewith, comprising:
   a processor coupled to each system in the plurality of vehicular systems;
   a first button deployed in the armrest and coupled to said processor for selecting one of the plurality of vehicular systems, said first button configured to be depressed along an activation axis;
   a first rotary dial deployed in the armrest and coupled to the processor for adjusting a first adjustable feature associated with the selected system;
   a second rotary dial deployed in the armrest and coupled to the processor for adjusting a second adjustable feature associated with the selected system, said first rotary dial and said second rotary dial having a substantially common linear rotational axis that is substantially co-linear with said activation axis; and
   a display mounted on the vehicle and coupled to said processor for identifying the selected system and first adjustable feature associated therewith.

8. A user interface according to claim 7 further comprising a second display mounted on the vehicle and coupled to said processor for indicating the selected system and the first adjustable feature associated therewith.

9. A user interface according to claim 8 wherein the vehicle includes a windshield and a center stack, and wherein said first and said second displays are mounted proximate the windshield and the center stack, respectively.

10. A user interface according to claim 7 wherein the armrest includes a driver side portion and a passenger side portion, and wherein the user interface further comprising a second button deployed in the armrest proximate the passenger side portion and coupled to said processor for selecting one of the plurality of vehicular systems.

11. A user interface according to claim 7 wherein said first and second rotary dials are different sizes.

12. A interface for use by an occupant of a vehicle having an armrest and a plurality of vehicular systems each having a plurality of adjustable features associated therewith, comprising:
   a display mounted on the vehicle for identifying the selected system and the adjustable feature associated therewith;
   a first button mounted on the armrest for inputting system selection data;
   a plurality of rotary dials mounted on the armrest for inputting feature adjustment data; and
   a processor coupled to said first button, said plurality of rotary dials, said display, and to each system in the plurality of vehicular systems, said processor for receiving said system selection data and said feature adjustment data and for causing the adjustable feature associated with said selected system to be adjusted in accordance therewith;

wherein said display is configured to be visually divided into a plurality of display columns including a first display column for indicating the system selection data and a second column for indicating the feature adjustment data, each rotary dial in said plurality of rotary dials configured to control a different vehicular feature displayed within a different display column in said plurality of display columns.

13. A user interface according to claim 12 wherein said plurality of rotary dials includes four rotary dials.

* * * * *